No. 681,696. Patented Sept. 3, 1901.
H. B. GRINNELL.
APPARATUS FOR HAULING ELECTRIC CABLES.
(Application filed Nov. 30, 1900.)
(No Model.) 3 Sheets—Sheet 1.
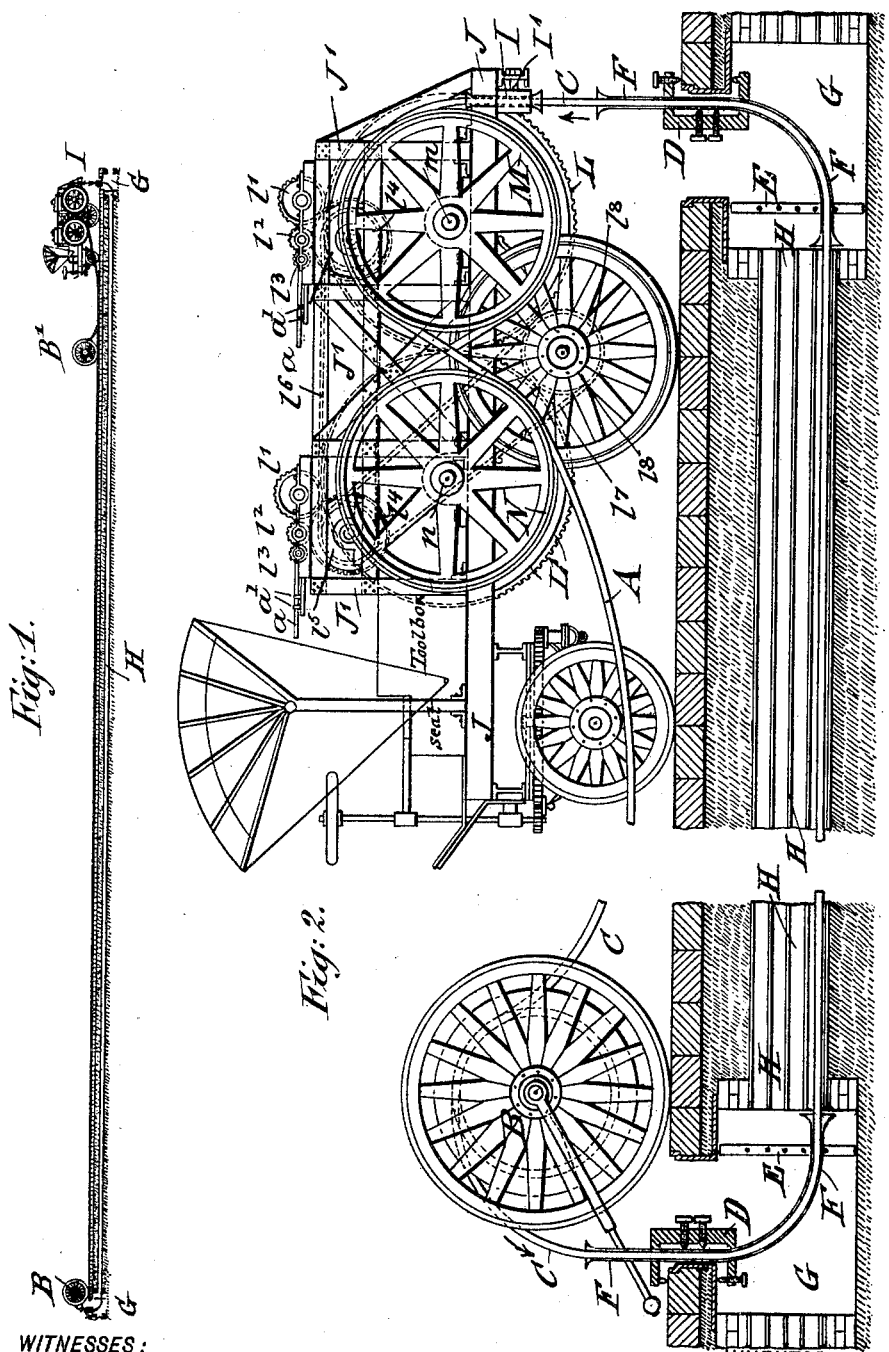
WITNESSES:
INVENTOR
Henry B. Grinnell
BY
ATTORNEYS No. 681,696. Patented Sept. 3, 1901.
H. B. GRINNELL.
APPARATUS FOR HAULING ELECTRIC CABLES.
(Application filed Nov. 30, 1900.)
(No Model.) 3 Sheets—Sheet 2.
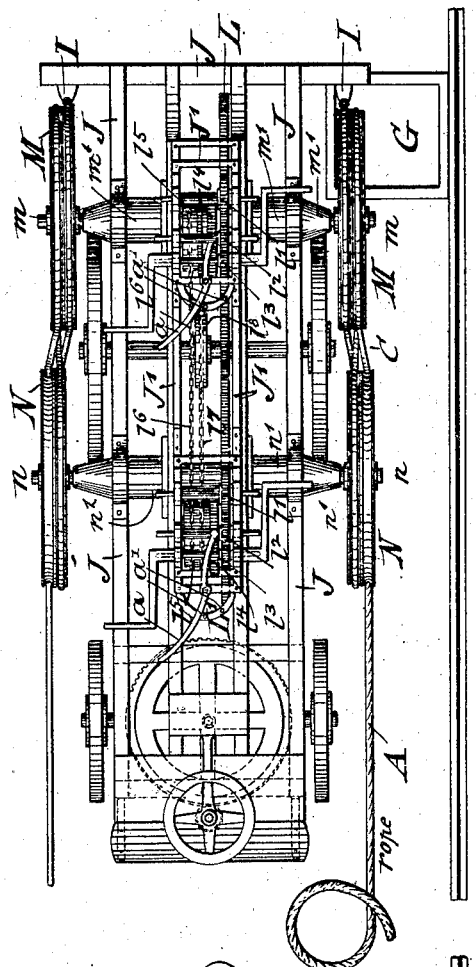

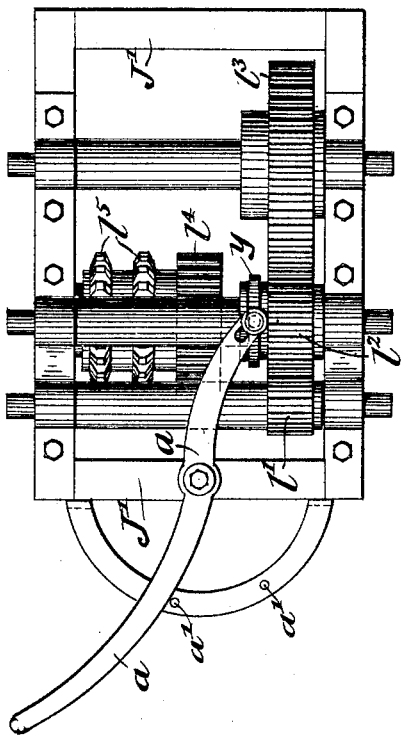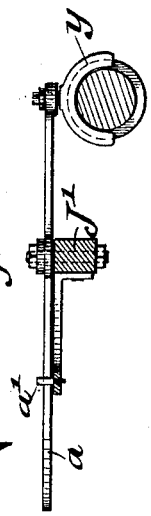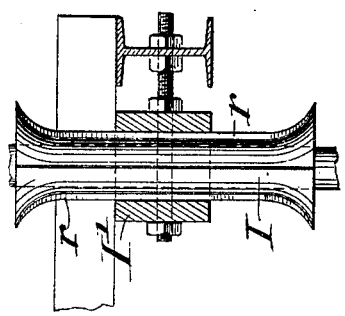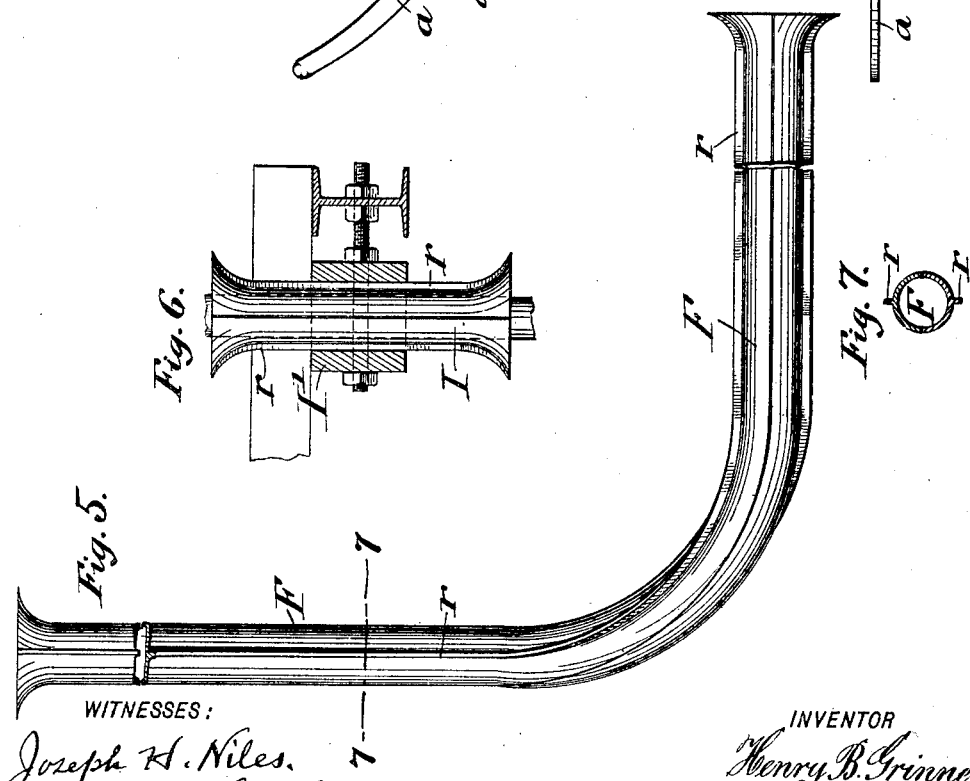

UNITED STATES PATENT OFFICE.

HENRY B. GRINNELL, OF NEW YORK, N. Y.

APPARATUS FOR HAULING ELECTRIC CABLES.

SPECIFICATION forming part of Letters Patent No. 681,696, dated September 3, 1901.

Application filed November 30, 1900. Serial No. 38,207. (No model.)

*To all whom it may concern:*

Be it known that I, HENRY B. GRINNELL, a citizen of the United States, residing in the city of New York, borough of Manhattan, in the State of New York, have invented certain new and useful Improvements in Apparatus for Hauling Electric Cables, of which the following is a specification.

This invention relates to an improved double apparatus for hauling electric feeders and cables into underground electric subway-ducts or upon overhead structures and poles or haul back a wholly or partly hauled-in feeder and cable out of ducts or off structures and poles in any direction or at any angle without injuring the same and deliver directly to reels without obstructing vehicles, cars, or personal traffic upon the streets and sidewalks or having to stop the work at any time or place by reason of the same. The apparatus delivers the electric feeders and cables directly from apparatus to reel, when hauling out without second handling, the hauling-rope to coil at manhole and the rope-piloting wire to a reel on the apparatus without encumbering the streets and sidewalks and covering them with rust and muddy substances which, as well as the men handling the feeders or cables, are rendered on that account objectionable to the public. By the use of my improved apparatus the entire work is confined to the manholes and to the apparatus itself without the use of long stretches of streets and sidewalks, while the special appliances united in my apparatus serve for facilitating the rapid and safe hauling of electric feeders and cables at a considerable reduction in cost.

The apparatus is specially adapted for the hauling of cables of underground electric railways, as the manholes are small and close to the rails and as the work is difficult to perform continuously without interfering with the cars and other traffic. It was therefore more especially chosen as an example for showing the advantages to be derived from the use of my improved double apparatus over all others for hauling electric feeders or cables into or out of ducts of electric subways or upon or off structures and poles of any description; and for this purpose my invention consists of a portable double hauling apparatus with its double hauling-sheaves, driving and propelling mechanisms, double adjustable guides on the apparatus, guide chutes and clamps at the manholes, and reels for the cable and piloting-wire, as will be fully described hereinafter and finally pointed out in the claims.

In the accompanying drawings, Figure 1 is a vertical longitudinal section of an underground electric-railroad subway, showing my improved double apparatus in the act of hauling an electric feeder or cable through, in, or out of a subway-duct from the reel by a rope. Fig. 2 is a similar vertical longitudinal section with a part of the subway broken off, showing the apparatus and the reel for delivering the feeder, drawn on a larger scale. Fig. 3 is a plan view of Fig. 1. Fig. 4 is a plan view of the apparatus shown in Fig. 2; and Figs. 5, 6, 7, 8, and 9 show in detail the guides and chutes for the cable and the shifting mechanism for the operating-gears of the apparatus, Fig. 7 being a transverse section through the chute on line 7 7, Fig. 5.

Similar letters of reference indicate corresponding parts.

Referring to the drawings, A represents the hauling-in rope, usually a Manila rope of sufficient size and strength for hauling any size of feeder or cable, which rope is equipped with clamp, swivel-chain, and clip-hooks for connection with the feeder or cable. B is the reel, which delivers or receives the feeder or cable and which is supported on large wheels, with steel shaft, bail, and handle, capable of holding and transporting any size of reel. The reel is operated by four men.

C is the feeder or cable, which is to be hauled in or out of the duct by the rope A from or to the reel.

D is a clamp, which is made of steel and provided with double steel screws for adjustment to the required slant of the chutes F, by which the feeder or cable is delivered into the duct or taken from the same in case of hauling the feeder or cable out.

E is a vertical frame with transverse rounds for holding the lower end of the chute rigidly in place and in line with the duct into or out of which the feeder or cable is to be hauled. The chutes F are made in tubular form, with funnel-shaped ends bent at their middle portions and twisted toward the side, as shown in detail in Fig. 5. They are split lengthwise in two halves, which are doweled together at the edges and reinforced by iron ribs $r$ on back and front. Each half is placed separately in position or removed separately without reeving or unreeving rope, feeder, or cable. The two halves are held together by the clamping-screws of the clamp D, in which the chute is clamped.

G are manholes of an electric-railway subway, and H the subway-ducts, which run parallel with the track. A piloting-wire for hauling the hauling-in rope A is previously placed in the duct through which a cable is to be hauled. The pilot-wire is connected to the hauling-rope above the upper or ingoing end of the chute F. The manholes are arranged close to the track. By means of the side twist in chute F the portable double hauling apparatus can be placed close to the track, but clear of the same.

To each side of the rear part of the main frame of the hauling apparatus is attached an adjustable guide I, which is split lengthwise into two halves, like the chutes, so as to permit the removing or replacing of each half separately and avoid reeving or unreeving of rope, feeder, or cable. The guide I conducts the feeder or cable from the upper end of the outgoing chute F to the inner groove of the rear sheave of the hauling apparatus. The guide I is rigidly held in place by a clamp I' after the guide I has been adjusted above the upper end of the outgoing chute.

J is the main frame of the wheeled double hauling apparatus, on which the power-transmitting mechanisms are supported. The main frame is covered with planks that form a flooring for the eight men by which the power for the double hauling apparatus is furnished. In place of hand-power, steam or other power may be used for hauling the cable or feeder and for moving the apparatus from place to place.

At the front end of the main frame J are arranged a tool-box, a seat for the driver or engineer, a footboard, a folding cover for the seat, a foot-brake, and a hand-wheel and shaft for the steering-gear. The steering-shaft is supported in suitable bracket-bearings at the front end of the main frame and provided with a pinion at its lower end, that meshes with a gear-wheel on the lower half of the fifth-wheel.

The main frame J is made of I-beams and angle-irons, which are bolted and riveted together and supported by springs on the axles of the front and hind wheels and provided with a pole and whiffletrees for drawing the double hauling apparatus by horses to or from the place of use.

On the main frame J is supported a gear-frame J', which is arranged at the center of the main frame and located longitudinally of the same. It is braced in a suitable manner, extending backwardly from the tool-box to the rear end of the main frame. On the gear-frame J' are supported bearings for the gear-wheel mechanisms, by which motion is transmitted to the double hauling-sheaves, that are arranged at both sides of the main frame J, and to the axle of the hind wheels when the double hauling apparatus is propelled from place to place. The double hauling-sheaves M and N are applied to shafts $m$ and $n$, which are supported in double journal-bearings $m'$ $n'$, that are supported on the main frame J and are firmly attached thereto. The bearings $m'$ and $n'$ are made of cast-iron and provided with brasses at each end, said bearings extending close up to the hubs of the sheaves M and N. The sheaves M and N are each provided with two circumferential grooves and rotated together in opposite direction to each other, so as to haul the feeder or cable through the duct. The front sheaves are not in the same plane with the rear sheaves, but located for a short distance out of the plane of the rear sheaves, so as to facilitate the convenient passage of the feeder or cable from one sheave to the other and from the inner to the outer grooves. There is a small space between the sheaves, so as to give the required space for the hauling rope or cable in placing or removing the rope or cable without reeving or unreeving the same. To the shafts of the main sheaves M and N are keyed large gear-wheels L L', which mesh with each other and which are driven by double sets of gear-wheels $l'$ $l^2$ $l^3$, which mesh with each other and the shafts of which are supported in suitable bearings on the upper gear-frame J'. The ends of the shafts of these gear-wheels are squared for applying to any one of them the hand-cranks by which the hauling-sheaves are operated. When the apparatus is to be started for pulling the hauling-rope through the duct, the cranks are applied to the shafts of the primary gear-wheels $l'$, while when greater power is required for hauling the cable the cranks are applied to the shafts of the intermediate gear-wheels $l^2$, while when the greatest amount of power is required the cranks are applied to the shafts of the gear-wheels $l^3$. The intermediate gear-wheels $l^2$ are splined to their shafts and are laterally movable on the same, so as to be shifted out of gear with the gear-wheels $l'$ $l^3$ and placed in gear with gear-wheels $l^4$, the shafts of which are supported in bearings below the shafts of the gear-wheels $l^2$. For shifting each gear $l^2$ a lever $a$, pivoted to the gear-frame J' and applied by a yoke $y$ to the hub of the gear and retained in position by keeper-pins $a'$ or other suitable means, is preferably employed, as shown in Figs. 8 and 9. On the shafts of the gear-wheels $l^4$ are arranged sprocket-wheels $l^5$, one of which is connected by a sprocket-chain $l^6$ with the sprocket-wheel on the shaft of the gear-wheel $l^4$ below the driving-wheel $l^2$ of the hind train of gears, so as to produce the simultaneous working of both sprocket-wheels. A second sprocket-wheel on the shaft of the gear-wheel $l^4$ is connected by a sprocket-chain $l^7$ with a sprocket-wheel $l^8$ on the axle of the hind wheels, said sprocket wheel and chains serving for transmitting the power to the hind wheels for moving the hauling apparatus from place to place when using steam or other power or by the action of the hand-driven cranks in case of emergency. When the hauling apparatus is moved from place to place, the intermediate gear-wheels $l^2$ are shifted into mesh with the transmitting sprocket wheels and chains by which the apparatus is propelled. They are returned, however, into mesh with the gear-wheels $l'$ $l^3$ whenever the sheaves have to be operated for hauling a feeder or cable through the duct. By the arrangement of the two sets of three gear-wheels $l'$ $l^2$ $l^3$, that decrease in diameter, the power applied to the hauling-sheaves is varied according to the power required for hauling the rope or cable through the duct. By the arrangement of the two sets of double-grooved sheaves and gear-wheel mechanisms relatively to each other on the supporting-frames J and J' of the apparatus the rope or cable, which is guided from the chutes to the hauling apparatus, passes first over the second groove of the hind sheave, from the same under and around the second groove of the front sheave, then under and over the first groove in the rear sheave, then under the first groove in the front sheave, without coming in contact with each other while passing from groove to groove or sheave to sheave in the space between the sheaves, and then to the reel on which the hauling-rope is coiled or to a cable-reel when a cable is hauled out of the duct for repairs or otherwise, in which case it is wound up on an ordinary cable-reel in the usual manner. This peculiar arrangement of the double-grooved sheaves relatively to each other is of great importance, as thereby the rope or cable is passed over the sheaves without coming in contact at any point and being subjected to injury.

Operation: The hauling of a rope, feeder, or cable is accomplished in the following manner: The pilot-wire has previously been placed into the duct through which the feeder or cable is to be hauled. The reel of feeder or cable which is to be hauled is moved by the attendants alongside of the ingoing manhole. The pilot-wire is next passed up through the ingoing chute and the hauling-rope fastened thereto at one end and the other end connected to the feeder or cable by means of clip-hooks, swivel-chain, and clamp in the usual manner. The opposite end of the pilot-wire is then passed through the outgoing chute and through the guide on the hauling apparatus and moved sufficiently so as to move the hauling-rope into the duct. Then the wire is placed around the sheaves from the side of apparatus and not rove from the end around the sheaves. The hauling apparatus is then started by placing the cranks on the shafts of gear-wheels $l'$. The pilot-wire as it is hauled by the sheaves is wound upon a suitable reel arranged on the forward part of the main frame J of the wheeled apparatus. (Not shown in the drawings.) When the first end of rope has passed over the sheaves, the wire is detached therefrom. The cranks are then placed on the intermediate shafts of the gear-wheels $l^2$ or on the shafts of the end gears $l^3$, as may be required, and the feeder or cable proper is then hauled through the duct. The hauling-rope is coiled down at the manhole as fast as the apparatus hauls it out of the duct, so as to be ready for the next section.

The removing of an electric feeder or cable from the duct is accomplished in the following manner: On arriving at the first manhole the wire-reel is placed near the same and the wire is attached to one end of the feeder or cable. The hauling apparatus is placed at the next or second manhole and a clevis or strands of wire fastened to the other end of the feeder or cable. The chute is then clamped in the manhole and the upright frame put in place over the lower end of the chute opposite the duct from which the cable or feeder is to be hauled. The end of the hauling-rope is then attached by clip-hooks to the loops or clevis on the end of feeder or cable and the rope passed through the chute, then through the guide at the rear end of the hauling apparatus, up and over the inner groove of the rear sheave, then under and over the inner groove of the front sheave, back under and over the outer groove of the rear sheave, and under the outer groove of the front sheave, to the winding-up reel B', which has been placed in front of the apparatus, as shown at the off side of Fig. 3, in which the hauling out is shown. When all is ready, the sheaves are turned by the cranks and the gear-wheels according to the power required for hauling the feeder or cable. As soon as the end of the feeder or cable reaches the reel it is attached to the drum of the same by a staple, at which time the rope is detached and the turning of the sheaves continued until the section or length of the cable has been hauled out and wound on the cable-reel, which is wheeled to the side of the street. The cable-reel is then removed from the wheels, shaft, bail, and handle and another empty reel placed on the shaft of the wheels and wheeled back to the apparatus, where it is set as before, ready for the second section or length of cable to be hauled. The cover is then replaced on the first manhole and the men are sent ahead to the third manhole, which is then uncovered, the wire being then attached to the end of the second section of feeder or cable. The chute at the second manhole is then taken off from that side of the manhole and fastened to the opposite side of the same manhole, the rope being attached by a clevis or wire strands to the opposite end of the second section of feeder or cable by clip-hooks, and the end of the rope is put through the chute and fastened to the end of the feeder or cable, the upright standard being first put in position and fastened so as to secure the lower end of the chute directly in front and in line with the duct. The rope is then placed into the chute and the guide at the rear end of the hauling apparatus placed over the sheaves in the manner before described and conducted over the winding-reel. The hauling apparatus is then set in motion and the feeder or cable is then hauled out from the duct until it is wound up on its reel, and so on.

The apparatus can also be used for hauling a cable into the duct of one section and simultaneously out of the duct of an adjacent section of the road, in which case both sets of sheaves are used for hauling. For hauling feeders or cables in or out of the ducts that pair of hauling-sheaves is used which is nearest to the manhole. The second set of sheaves at the opposite side of the apparatus is arranged simply for the purpose of convenience, so as to use either set of sheaves, as is most convenient in the particular case. When the apparatus is used for overhead structures or polework, where two or more feeders or cables are to be carried over the same route, the sheaves at each side of the apparatus can be employed for hauling each cable at the same time for placing in position or removing from the overhead structure or pole.

Having thus described my invention, I claim as new and desire to secure by Letters Patent—

1. An apparatus for hauling electric cables, consisting of a wheeled frame provided with hauling-sheaves and means for rotating the same, clamps attached to the manholes at the ends of each subway-section, chutes supported by said clamps and placed at their lower ends in line with the duct of the subway, and guides on the wheeled frame near the rear sheaves, substantially as set forth.

2. An apparatus for hauling electric cables, consisting of a wheeled frame provided with hauling-sheaves and means for rotating the same, clamps attached to the manholes of the ends of each subway-section, curved chutes supported by said clamps and placed at their lower ends in line with the special duct through which the cable is to be hauled, a cable-reel located near the ingoing manhole, and guide-tubes on the rear end of the wheeled frame above the chute of the outgoing manhole, substantially as set forth.

3. An apparatus for hauling electric cables, consisting of a wheeled frame provided with hauling-sheaves and means for rotating the same, clamps attached to the manholes at the ends of each subway-section, chutes supported by said clamps, a cable-reel near the ingoing manhole, supporting-frames for the lower ends of the chutes, and guide-tubes on the rear ends of the wheeled frame near the rear sheaves, substantially as set forth.

4. In an apparatus for hauling electric cables, a wheeled frame provided with rotary main sheaves located in planes parallel with each other, means for rotating the said sheaves in opposite directions, and a guide-tube near the circumference of the rear sheave for conducting the cable to the same, substantially as set forth.

5. In an apparatus for hauling electric cables, a wheeled frame provided with sheaves having two grooves located in planes parallel with each other, one somewhat outside the other, and separated therefrom, motion-transmitting mechanisms for imparting rotary motion in opposite directions to said sheaves, bearings for supporting the shafts of the sheaves on said frame, and an adjustable guide-tube at the rear part of the frame for conducting the cable onto the rear sheave, substantially as set forth.

6. In an apparatus for hauling electric cables, a wheeled frame consisting of a main frame and gear-frame, a pair of sheaves supported outside of the main frame, bearings on the main frame for the shafts of the sheaves, motion-transmitting gears on the gear-frame for imparting rotary motion in opposite direction to said sheaves, and cranks adapted to be applied to the shafts of the different motion-transmitting gears so as to impart varying power to the sheaves, substantially as set forth.

7. In an apparatus for hauling electric cables, a wheeled frame provided with hauling-sheaves, motion-transmitting mechanism for rotating the same in opposite direction to each other, sprocket wheels and chains for transmitting motion from the motion-transmitting mechanism of the sheaves to the hind axle, and shiftable gears adapted to be placed in mesh with the motion-transmitting mechanism of the sheaves or with the driving sprocket wheels and chains of the hind axle, for rotating the sheaves or propelling the wheeled frame, substantially as set forth.

8. In an apparatus for hauling electric cables, a wheeled frame, provided with main sheaves, motion-transmitting mechanisms for imparting rotary motion in opposite directions to said sheaves, one of the gear-wheels of each motion-transmitting mechanism being splined to its shaft and shiftable thereon, sprocket-wheels operated by said shiftable gear-wheels, a horizontal sprocket-chain connecting said sprocket-wheels, and a second sprocket-chain connecting a second sprocket-wheel on the shaft of one of the shiftable gear-wheels with the axle of the hind wheels for propelling the wheeled frame when required, substantially as set forth.

9. In an apparatus for hauling electric cables into ducts, the combination of a wheeled main frame, double-grooved hauling-sheaves, bearings for supporting the shafts of the same on the frame, motion-transmitting mechanisms for rotating the sheaves in opposite directions to each other, said sheaves being located in parallel planes, and a guide-sleeve at the rear end of said frame in line with the inner groove of the rear sheave, substantially as set forth.

10. In an apparatus for hauling electric cables, the combination of a wheeled frame provided with grooved hauling-sheaves, mechanisms for rotating the sheaves in opposite directions, clamps attached to the manholes at the ends of each subway-section, longitudinally-split chutes supported by said clamps and placed at their lower ends in line with the duct of the subway, and split guides on the rear end of the wheeled frame, substantially as set forth.

In testimony that I claim the foregoing as my invention I have signed my name in presence of two subscribing witnesses.

HENRY B. GRINNELL.

Witnesses:
PAUL GOEPEL,
GEORGE GEIBEL.